United States Patent
Schwarte et al.

(10) Patent No.: US 9,249,316 B2
(45) Date of Patent: Feb. 2, 2016

(54) AQUEOUS COATING COMPOSITIONS PIGMENTED WITH FLAKE-FORM METALLIC EFFECT PIGMENTS, PROCESSES FOR PREPARING THEM AND USE THEREOF FOR PRODUCING MULTICOAT PAINT FINISH

(75) Inventors: Stephen Schwarte, Emsdetten (DE); Ulrich Uekötter, Münster (DE); Peter Sonntag, Everswinkel (DE); Norbert Löw, Neustadt/Aisch (DE); Elke Roehr, Zell am Main (DE)

(73) Assignee: BASF Coatings GmbH, Muenster (DE)

( * ) Notice: Subject to any disclaimer, the term of this patent is extended or adjusted under 35 U.S.C. 154(b) by 96 days.

(21) Appl. No.: 13/579,199

(22) PCT Filed: Feb. 18, 2011

(86) PCT No.: PCT/EP2011/052466
§ 371 (c)(1),
(2), (4) Date: Oct. 15, 2012

(87) PCT Pub. No.: WO2011/101455
PCT Pub. Date: Aug. 25, 2011

(65) Prior Publication Data
US 2013/0143047 A1 Jun. 6, 2013

(30) Foreign Application Priority Data
Feb. 18, 2010 (DE) .................. 10 2010 008 541

(51) Int. Cl.
| | |
|---|---|
| C08L 75/04 | (2006.01) |
| C08L 33/02 | (2006.01) |
| C08L 33/08 | (2006.01) |
| C08L 33/10 | (2006.01) |
| C08K 3/34 | (2006.01) |
| C09D 5/36 | (2006.01) |
| C09D 7/00 | (2006.01) |
| C09D 7/12 | (2006.01) |

(52) U.S. Cl.
CPC ............. C09D 7/1216 (2013.01); C09D 5/36 (2013.01); C09D 7/004 (2013.01); C09D 7/1291 (2013.01); C08K 3/346 (2013.01); C08L 33/08 (2013.01); C08L 33/10 (2013.01); C08L 75/04 (2013.01); Y10T 428/31551 (2015.04)

(58) Field of Classification Search
CPC .... C09D 7/1291; C09D 7/1216; C09D 7/004; C08L 75/04; C08L 33/02; C08L 33/08; C08L 33/10; C08K 3/346
See application file for complete search history.

(56) References Cited

U.S. PATENT DOCUMENTS

| | | | | |
|---|---|---|---|---|
| 6,306,942 B1 * | 10/2001 | McCarthy et al. | ............. | 524/195 |
| 6,900,260 B1 * | 5/2005 | Mangels et al. | ............... | 524/366 |
| 6,997,980 B2 * | 2/2006 | Wegner et al. | ................ | 106/403 |
| 7,297,375 B2 * | 11/2007 | Wegner et al. | ................ | 427/553 |
| 7,479,308 B2 * | 1/2009 | Baumgart et al. | ............ | 427/508 |
| 8,361,217 B2 * | 1/2013 | Voit et al. | ....................... | 106/404 |
| 2008/0087187 A1 * | 4/2008 | Maul et al. | ................. | 106/14.44 |
| 2008/0134940 A1 * | 6/2008 | Wheeler | ....................... | 106/400 |
| 2009/0274735 A1 * | 11/2009 | Wakamiya | ..................... | 424/401 |

FOREIGN PATENT DOCUMENTS

| | | |
|---|---|---|
| DE | 4009858 A1 | 10/1991 |
| DE | 4437535 A1 | 4/1996 |
| DE | 19914896 A1 | 10/2000 |
| DE | 19948004 A1 | 7/2001 |
| DE | 10010416 A1 | 9/2001 |
| DE | 10053890 A1 | 5/2002 |
| DE | 10043405 C1 | 6/2002 |
| DE | 10223652 A1 | 12/2003 |
| DE | 10240972 A1 | 3/2004 |
| DE | 102007036369 A1 * | 2/2009 |
| EP | 0826745 A2 | 3/1998 |
| EP | 1591492 A1 | 11/2005 |
| WO | WO02053658 A2 | 7/2002 |
| WO | WO2005118722 A1 | 12/2005 |
| WO | WO2006017197 A1 | 2/2006 |
| WO | WO2006040284 A1 | 4/2006 |
| WO | WO2007050295 A2 | 5/2007 |
| WO | WO2008141768 A1 | 11/2008 |
| WO | WO2009100938 A1 | 8/2009 |
| WO | WO2011101455 A1 | 8/2011 |

OTHER PUBLICATIONS

Eckart (Stapa: Aluminum pastes for aqueous coating systems. Eckart Effect Pigments. May 2010, 32 pages).*

(Continued)

*Primary Examiner* — Brieann R Fink
(74) *Attorney, Agent, or Firm* — Servilla Whitney LLC

(57) ABSTRACT

Disclosed are curable aqueous coating compositions comprising at least one polyurethane (A) as binder, at least one laminar metallic effect pigment (B), and at least one inorganic thickener C1) selected from the group of the phyllosilicates, and at least one organic thickener C2) selected from the group of the (meth)acrylic acid-(meth)acrylate copolymer thickeners and polyurethane thickeners, where the amount of B), based on the total binder content of the coating material composition is >9% by weight, the total solids based on the coating material composition is between 12.5% and 17% by weight, the total amount of the thickeners C1 and C2), based on the total binder content of the coating composition is <12.5% by weight, the weight ratio of C2) to C1) is >0.4, and the amount of B), based on the coating material composition, is between 1.2 and 2.3% by weight.

13 Claims, No Drawings

(56) References Cited

OTHER PUBLICATIONS

English Translation of International Search Report for International Application No. PCT/EP2011/052466 mailed May 25, 2011, 2 pages.
Written Opinion for International Application No. PCT/EP2011/052466 mailed May 25, 2011, 27 pages.
International Preliminary Report on Patentability for International Application No. PCT/EP2011/052466 issued Aug. 21, 2012.
Thieme Rompp Online, Georg Thieme Verlag, "Vapor Deposition", 2012, last updated Dec. 2007, 3 pages.
Machine Translation of Thieme Rompp Online, Georg Thieme Verlag, "Vapor Deposition", 2012, last updated Dec. 2007, 6 pages.
Bestätigung for STAPA HYDROLUX 2154 Aluminium dated Sep. 7, 2015 from Eckhart, 1 pg.
Bestätigung for STAPA HYDROLUX 51284/G Aluminium dated Sep. 7, 2015 from Eckhart, 1 pg.

* cited by examiner

AQUEOUS COATING COMPOSITIONS PIGMENTED WITH FLAKE-FORM METALLIC EFFECT PIGMENTS, PROCESSES FOR PREPARING THEM AND USE THEREOF FOR PRODUCING MULTICOAT PAINT FINISH

CROSS REFERENCE TO RELATED APPLICATIONS

This application is a National Phase Application of Patent Application PCT/EP2011/052466 filed on 18 Feb. 2011, which claims priority to DE10 2010 008 541.3, filed 18 Feb. 2010, both of which are hereby incorporated by reference in their entirety.

FIELD OF THE INVENTION

The present invention relates to aqueous pigmented coating materials, to their preparation and use for producing multicoat paint systems, and also to a process for producing multicoat paint systems and to multicoat paint systems obtained by said process.

BACKGROUND OF THE INVENTION

The well-established aqueous or solventborne coating materials, particularly those known as basecoat materials, and the multicoat effect paint systems produced using them exhibit performance properties that are substantially good.

The continually growing technical, and more particularly esthetic, requirements of the market, particularly of the automakers and their customers, however, are necessitating a continual onward development of the technical and esthetic level attained to date. Modern bodywork design, with its pronounced rounding, fits in very well with finishes exhibiting a pronounced flip-flop effect. The desire to produce an effect resembling metal can be realized through the use of very thin aluminum flakes, with sizes in the nanometer range, of the kind described in EP 0826745 A2, for example.

More particularly, there is a need for new coating materials which allow production of basecoats exhibiting a particularly strongly pronounced light/dark behavior. At the same time, however, the advantages achieved by the known basecoat materials and the basecoats produced from them should not be lost, but should instead be retained to at least the same extent and preferably a greater extent.

The corresponding effect-imparting and also, where appropriate, color-imparting basecoats are therefore to possess, in particular, good haze behavior, i.e., no haze, good leveling, and a very good overall visual appearance. Furthermore, the basecoats are to be free from paint defects, light/dark shading (clouds), and bits. The resulting coatings are, furthermore, to have no optical defects and to possess satisfactory adhesion to the clearcoat.

The coating materials are additionally to feature high storage stability, i.e., no significant deterioration in the properties either of the coating materials or of the coatings produced from these coating materials after storage of the latter at 40° C. (for 28 days). Hence there is to be no significant deterioration in the rheological properties of the coating materials, more particularly no significant increase in viscosity, and no bittiness and no significant deterioration in metallic flop.

Conventional, prior-art aqueous basecoats are easy to produce, stable on storage and transportable. In terms of application, technological properties (adhesion, long-term weathering), storage stability and circuit line stability, and also in terms of appearance, they meet the requirements that are usual within automobile finishing.

EP 1 591 492 A1 describes, for example, a basecoat material which comprises metallic pigments, which can be aqueous or solvent-based, and which includes a relatively high fraction of the metallic pigment—preferably 12% to 20% by weight based on the total binder content. The focus of EP 1 591 492 A1, however, is on providing highly moisture-stable systems.

WO 2006/017197 A1 discloses a process for producing special-effect finishes, which uses relatively low fractions of a laminar metallic pigment with comparatively high quantities of binder and solids fractions in order to produce an effect paint, the paint requiring use not only of the laminar metallic pigment but also of at least one further, additional special-effect pigment.

SUMMARY OF THE INVENTION

The metallic light/dark behavior (referred to as flop, metallic flop or flip-flop) of solventborne basecoats of the kind used, for example, for rim coatings, however, is usually far from being achieved when aqueous basecoat materials comprising effect pigments are used.

One of the routes adopted in the prior art to achieving a maximum flip-flop effect is to include PVD aluminum flakes as pigments in the production of the metallic paint, the precise tailoring of the amount of the further components in the aqueous paint system being of critical importance. For instance, aqueous compositions which are curable physically, thermally, and both physically and thermally, which comprise metallic effect pigments, which are easy to prepare, which meet numerous requirements of current aqueous vehicle finishes and which, furthermore, exhibit a pronounced flip-flop effect are known from WO 2008/141768 A1.

The coating materials described in WO 2008/141768 A1 are suitable for use as aqueous basecoat materials for producing effect, or color and effect, basecoats in multicoat paint systems, and exhibit good application behavior and excellent flow. Even in thin films and at comparatively low concentrations of metallic effect pigment, they are able to exhibit high hiding power, good intercoat adhesion, particularly high condensation resistance, an isotropic pigment distribution, an especially strongly pronounced light/dark behavior, and also a very high metallic brilliance and a very high gloss. In addition, the coating materials disclosed by WO 2008/141768 A1 are largely free from film defects, such as light/dark shading (clouds) and bits. Moreover, they have a chrome-like mirror effect and, where they are also color-imparting, they have a particularly elegant full color effect with low sparkle effect (glitter effect).

For certain applications, however, an excessive mirror effect on behalf of the coatings may be a disadvantage, as for example in an environment highly susceptible to soiling, where soiling of a coating may appear to be intensified as a result of the mirror effect. Furthermore, there is a need for aqueous coating materials which, even after exposure in the constant condensation climate test, possess outstanding strength of adhesion, have no tendency to form bubbles, and exhibit very high gloss retention. In particular, there should be outstanding adhesion to one-component clearcoats (1K clearcoats), and the hiding power should be optimized. A further disadvantage of the prior art, to be overcome by the present invention, lies in the unsatisfactory substrate masking. For suitability for use as an OEM production-line coating material, it is very important that substrate defects, such as sanding marks, sanding scars and polishing spots, or marks from the grippers on the conveyer belt or machinery, are effectively masked.

It has been found that the above requirements are met through the provision of thermally and/or physically curable aqueous coating material compositions which comprise A) at least one polyurethane selected from the group consisting of physically curable, thermally self-crosslinking and/or thermally externally crosslinking, ionically and/or nonionicaliy stabilized polyurethanes which are saturated, unsaturated and/or grafted with olefinicaliy unsaturated compounds, as binder,
B) at least one laminar metallic effect pigment not produced via a PVD process, and
C) at least one inorganic thickener C1) selected from the group of the phyllosilicates, and at least one organic thickener C2) selected from the group of the (meth)acrylic acid-(meth)acrylate copolymer thickeners and polyurethane thickeners, where
i) the amount of B), based on the binder content of the coating material composition is 9%, preferably 11% and more preferably >13% by weight,
ii) the total solids based on the coating material composition is ≥12.5%, preferably >13.5% and more preferably >15% by weight,
iii) the total amount of the thickeners C1) and C2), based on the binder content of the coating composition is <12.5%, preferably <11% and more preferably <9.5% by weight, and
iv) the weight ratio of C2) to C1) is >0.4, preferably >0.5.

The reference herein to "binder" in deviation from DIN EN ISO 4818 is a reference only to the nonvolatile fraction of coating material compositions without pigments, without fillers, and with the thickeners C1) and C2) subtracted. The nonvolatile fraction is the mass residue remaining following evaporation at 120° C. for a period of 60 minutes. Subtracted from the nonvolatile fraction are the mass fractions of pigments, fillers and thickeners C1) and C2) as weighed in.

The terms (meth)acrylic acid and (meth)acrylate in this specification encompass methacrylic acid and acrylic acid and methacrylate and acrylate, respectively.

The coating material compositions of the invention are also referred to below as "compositions of the invention".

The present invention further provides a process for preparing the coating material compositions of the invention, by mixing the coating material constituents and homogenizing the resulting mixture. This process is referred to below as "process of the invention".

Further provided by the invention, not least, is the use of the compositions of the invention and of the compositions of the invention prepared by the process of the invention, as coating material, more particularly as paint material, preferably as basecoat material. This use is referred to as "inventive use".

Additional subject matter of the invention will become apparent from the description, and encompasses more particularly a process for producing a multicoat paint system and also multicoat paint systems produced by the process.

In the light of the prior art it was surprising and unforeseeable to a person skilled in the art that the object on which the present invention is based might be achieved by the compositions of the invention, the process of the invention, the inventive use and, particularly, the multicoat paint systems of the invention.

A particular surprise was that the compositions of the invention are storage-stable and transportable even under sharply fluctuating temperatures. At the same time there is also no evolution of gas. Even after prolonged shearing, the compositions did not exhibit any settling of metallic effect pigments or other constituents.

The coating materials are outstandingly suitable for use as aqueous basecoat materials for producing effect basecoats or color and effect basecoats of multicoat paint systems. In these contexts they have shown excellent application behavior, even with electrostatic application methods (such as ESTA), and outstanding flow.

Even in comparatively thin films and at comparatively low metallic effect pigment concentrations, the effect basecoats and color and effect basecoats exhibit high hiding power, outstanding intercoat adhesion, more particularly a high adhesion to one-component clearcoats, particularly high condensation resistance, an isotropic pigment distribution, an especially strongly pronounced light/dark behavior (metallic flop), very high metallic and very high gloss. At the same time, they are free from paint defects, such as light/dark shading (clouds) and bits. Overall, indeed, they exhibit a chrome-like mirror effect and, where they are also color-imparting, possess a particularly elegant, full color effect with a low is sparkle effect (glitter effect).

The compositions of the invention comprise at least one polyurethane (A) as binder.

The polyurethane (A) is selected from the group consisting of physically curable, thermally self-crosslinking and/or thermally externally crosslinking, ionically and/or nonionically stabilized polyurethane resins which are saturated, unsaturated and/or grafted with olefinically unsaturated compounds.

With regard to the qualities of being "physically curable", "thermally self-crosslinking" and "thermally externally crosslinking" and also to the physical conditions on which these qualities are based, reference is made to German patent application DE 100 10 416 A1, page 3 lines 11 to 30, and page 5 lines 33 to 41, and page 5 line 47 to page 8 line 6. The description there in connection with (meth)acrylate (co)polymers applies here, mutatis mutandis.

"Physically curable", accordingly, means that no crosslinking agents are needed for curing, but that instead curing takes place by loss of solvent from the applied film. The linking takes place typically via looping between the polymer molecules, whose molecular weight does not change. Physical curing may also take place through the coalescence of binder particles, as is frequently the case with dispersions (cf. Römpp Lexikon Lacke and Druckfarben, Georg Thieme Verlag, Stuttgart, New York, 1998, pages 274 and 275: "Curing").

The binders may also be "thermally self-crosslinking" and/or "thermally crosslinking". In the context of the present invention the term "self-crosslinking" refers to the capacity of a binder to enter into crosslinking reactions with itself. A requirement for this is that the binders already contain both kinds of complementary reactive functional groups that are necessary for crosslinking. Coating materials referred to as "externally crosslinking", in contrast, are those in which one kind of the complementary reactive functional groups is present in the binder and the other kind in a curing or crosslinking agent used as well where present. For further details of this refer to Römpp Lexikon Lacke und Druckfarben, Georg Thieme Verlag, Stuttgart, New York, 1998, "Curing", pages 274 to 276, more particularly page 275, bottom.

Preferably the polyurethane (A) is thermally externally crosslinking. The thermal crosslinking or curing may also be assisted by the physical curing of the polyurethane (A).

The polyurethane (A) may also be grafted with olefinically unsaturated compounds. For preparing such grafted polyurethanes, a particularly preferred graft base used is an unsaturated, preferably olefinically unsaturated, polyurethane (A). With very particular preference, the olefinically unsaturated polyurethane (A) comprises terminal and lateral, more particularly lateral, olefinically unsaturated groups.

With very particular preference the polyurethane (A) is stabilized ionically, more particularly anionically. Carboxylate groups are used for this purpose, in particular.

Examples of suitable polyurethanes (A) are known from German patent applications
   DE 40 09 858 A1, column 6 line 18 to column 10 line 23,
   DE 44 37 535 A1, page 2 line 27 to page 6 line 22,
   DE 199 14 896 A1, column 4 line 26 to column 11 line 5,
   DE 100 43 405 C1, column 5, paragraph [0030],
   DE 199 48 004 A1, page 3 line 14 to page 13 line 48,
   DE 100 53 890 A1, column 3, paragraph [0016] to column 18, paragraph [0123], or
   DE 102 23 652 A1, column 3, paragraph [0019] to column 16, paragraph [0101].

The amount of polyurethane binder (A) is preferably set such that in the compositions of the invention, the weight of the laminar metallic effect pigments (B) based on the binder content of the composition of the invention is 9.1% to 20%, preferably 11.1% to 19.5%, more preferably 12.1% to 19% and very preferably 13 to 17.0% by weight.

Besides the mandatory polyurethane binder(s) (A) there may also be further resins present in the coating material composition of the invention, such as polyester resins or poly(meth)acrylate resins, for example. The binder content of the composition of the invention is preferably at least 11.0% by weight, better still at least 11.5%, more preferably 12.0% to 14.5% and very preferably 12.2% to 13.5% by weight based on the total weight of the composition of the invention.

The amount of binder (A) based on the binder content (which is defined, as indicated above, without the fraction of thickeners C1) and C2) and also without pigments and without fillers) is preferably at least 30%, more preferably at least 37.5%, or even more than 42.5% by weight.

The compositions of the invention comprise at least one laminar metallic effect pigment (B). Surprisingly, laminar metallic effect pigments (B) used in the compositions of the invention are those metallic effect pigments which are not produced, as in WO 2008/141768 A1, via PVD processes (Physical Vapor Deposition). However, this does not rule out the additional use of PVD pigments per se as admixing constituent of the compositions of the invention. The PVD processes are vacuum coating processes for producing thin layers, in which the metal, aluminum in particular, is transferred to the gas phase by purely physical methods before being deposited on the substrate (cf. Römpp Online, Georg Thieme Verlag, 2004, "PVD process"). The process is more costly and inconvenient as compared with the production of other metallic effect pigments. Likewise as an admixture to be distinguished from (B) in a minor amount, it is possible to use so-called "cornflake pigment grades".

It has been found that, for achieving the objects on which the invention is based, it is particularly advantageous to use laminar metallic effect pigments (B) with what is called a silver dollar morphology. Typical pigments with sliver dollar morphology are produced from a specific atomized metal powder with spherical morphology, which in the course of subsequent grinding is merely deformed and not comminuted. Particular preference is given to silver dollar pigments made from aluminum. Suitable, typical silver dollar pigments which so can be used in the compositions of the present invention are, for example, the pigments sold by the company Eckart as 3000-series products, under the trade names Hydrolux, Hydrolan or Hydrolac (grades stabilized for aqueous basecoat material). Hydrolux pigments are "non-leafing" aluminum pigment pastes that are chrome-treated and Hydrolan pigments are silica-encapsulated aluminum flakes with long term stability in waterbased coatings.

Very particularly preferred metallic effect pigments (B) used are those with silver dollar morphology that have a narrow particle size distribution. The particle size distribution can be represented in metrological terms as a plot of the cumulative undersize in which the percentage of particles below a certain size is counted cumulatively. For a simplified description of the cumulative undersize plot, three figures are employed: $D_{10}$, as a measure of fineness, $D_{50}$, as the average pigment fineness/mean value; and $D_{90}$ to characterize the coarse fraction in the pigment. These figures describe the size distribution of all metallic pigments with specific accuracy. $D_{50}$ values for wet film applications are between about 5 μm and typically 55 μm. In the present invention, metallic effect pigments (B) having $D_{50}$ values of up to 30 μm are preferred. The span between $D_{10}$ and $D_{50}$ values characterizes the breadth of the particle size distribution. The smaller the span between $D_{10}$ and $D_{90}$, the narrower the particle size distribution, in other words the smaller the ratio of $D_{90}$ to $D_{10}$, and hence the narrower the particle size distribution and, accordingly, the greater the preference with which the particles can be used in the compositions of the invention.

The $D_{10}$, $D_{50}$ and $D_{90}$ values are determined by means of laser granulometry. The particle size distribution is determined by evaluating the scattered-light intensity of diffraction specimens as a function of the scattering angle. This is done using the Cilas 1064 laser granulometer from Quantachrome. The samples are prepared by first dispersing 1.5 g of the metallic effect pigment (B) into 10 ml of isopropanol with the aid of a flat brush. Isopropanol is then used to make up the total volume to 100 ml, and the pigment suspension in a glass beaker is homogenized for 5 minutes in an ultrasound bath (Bandelin Sonorex TK 52). After the end of the ultrasound treatment, the sample is kept homogeneous by stirring with a magnetic stirrer. The particle size parameters are measured using the instrument's own Cilas software, with selection of the measuring range "A1" in the standard operating procedure (SOP). Measurement takes place in cleaned cuvettes, the pigment dispersion being circulated through the measuring cuvette. The measurement is evaluated automatically by the laser granulometer's own software. This gives the figures for "diameter at 10%" ($D_{10}$), "diameter at 50%" ($D_{50}$), and "diameter at 90%" ($D_{90}$).

A particular surprise was that sufficient hiding power was obtainable in spite of the narrow particle size distribution.

The laminar metallic effect pigment (B) preferably has a $D_{90}/D_{10}$ ratio of less than 4.5, more preferably of less than 4 and very preferably of 2 to 3.

Examples of typical laminar metallic effect pigments (B) are Hydrolux 3590 ($D_{10}$=7 μm, $D_{50}$=12 μm and $D_{90}$=18 μm) or Hydrolan 3560 ($D_{10}$=10 μm, $D_{50}$=15 μm and $D_{90}$=24 μm).

The amount of the laminar metallic effect pigments (B) in the compositions of the invention is dependent, as described above, on the binder content in particular. Relative to the composition of the invention as a whole, the amount of (B) is preferably 0.75% to 4.0%, more preferably 0.9% to 3%, and very preferably 1.2% to 2.3% by weight.

Where the preferred silver dollar aluminum pigments are used as metallic effect pigments (B), they are preferably surface-passivated. Surface passivation of such pigments is described in WO 2005/118722 (page 7 lines 17 to 29) for example. The particle size distribution and also the $D_{10}$, $D_{50}$ and $D_{90}$ figures are determined on the pigments after they have been surface passivated or surface modified.

Thickener (C) used is at least one inorganic thickener (C1) selected from the group of the phyllosilicates. Suitable more particularly are phyllosilicates from the subgroup of the smectites, more particularly with the subgroups montmorillonite, hectorite and the synthetic Laponite. One typical representative of the inorganic thickeners is a sodium magnesium phyllosilicate which is obtainable under the trade name Laponite RD®.

In addition to the inorganic phyllosilicates (C1) it is necessary in accordance with the invention to use one or more organic thickeners (C2). They are preferably selected from the group consisting of (meth)acrylic acid-(meth)acrylate copolymer thickeners, such as, for example, the commercial product Viscalex HV30 (Ciba, BASF) and polyurethane thickeners, such as, for example, the commercial product Nopco® DSX 1550 from Cognis.

(Meth)acrylic acid-(meth)acrylate copolymer thickeners (C2) are those which comprise in copolymerized form, in addition to acrylic acid and/or methacrylic acid, one or more acrylic esters (i.e., acrylates) and/or one or more methacrylic esters (i.e., methacrylates). Common to the (meth)acrylic acid-(meth)acrylate copolymer thickeners is that in an alkaline medium, in other words at pH levels >7, more particularly >7.5, they exhibit a sharp increase in viscosity through salt formation by the acrylic acid and/or methacrylic acid, in other words through the formation of carboxylate groups. Where (meth)acrylic esters are used that are formed from (meth)acrylic acid and a $C_1$-$C_6$ alkanol, the thickeners obtained are substantially non-associative (meth)acrylic acid-(meth)acrylate copolymer thickeners, such as the aforementioned Viscalex HV30, for example. Substantially non-associative (meth)acrylic acid-(meth)acrylate copolymer thickeners are also referred to in the literature as ASE thickeners (Alkali Soluble/Swellable Emulsion or dispersion). In the present invention, these are preferred as (meth)acrylic acid-(meth)acrylate copolymer thickeners. As (meth)acrylic acid-(meth)acrylate copolymer thickeners, however, it is also possible to use those known as HASE thickeners (Hydrophobically Modified Anionic Soluble Emulsions or dispersions). They are obtained when the alkanol or alkanols used, instead of or in addition to the $C_1$-$C_6$ alkanols, include those having a larger number of carbon atoms, 7 to 30, for example, or 8 to 20 carbon atoms. HASE thickeners have a substantially associative thickening effect. The (meth)acrylic acid-(meth)acrylate copolymer thickeners used in accordance with the invention are not suitable, on account of their thickening properties, as binder resins, and so are not covered by the poly(meth)acrylates permitted as an admixture to the binders (A), and are therefore explicitly different from all other possible poly (meth)acrylate-based admixtures that may be used in the coating material compositions of the invention.

Polyurethane thickeners (C2) should be understood to be the associative thickeners referred to in the literature as HEUR (Hydrophobically Modified Ethylene Oxide Urethane Rheology modifiers). In chemical terms, they are nonionic branched or unbranched block copolymers of polyethylene oxide chains, polypropylene oxide chains or polyethylene oxide-propylene oxide) chains, which are linked to one another via urethane bonds and which carry terminal long-chain alkyl or alkylene groups having 8 to 30, preferably 10 to 24 and more preferably 12 to 20 carbon atoms or aryl groups or alkylated aryl groups having 6 to 30, preferably 6 to 20 carbon atoms. Typical alkyl groups are for example dodecyl or stearyl groups; an example of a typical alkylene group is an oleyl group; a typical aryl group is the phenyl group; and an example of a typical alkylated aryl group is a nonylphenyl group. On account of their thickening properties and structure, the polyurethane thickeners used in accordance with the invention are not suitable as binder resins, particularly as binders (A). They are therefore explicitly different from all other possible polyurethanes that may be used in the coating material compositions of the invention.

As organic thickener (C2) it is especially preferred to use a combination of a (meth)acrylic acid-(meth)acrylate copolymer thickener and a polyurethane thickener. One particular embodiment employs an ASE thickener together with an HEUR thickener.

The compositions of the invention are aqueous, i.e., they comprise water, in which the above-described constituents (A), (B) and (C) are dispersed, emulsified and/or dissolved. In addition to water as the main liquid carrier medium, however, there may also be amounts of organic solvents present, these amounts being typical of those found in water-based paint. The amount of organic solvents, however, ought as far as possible not to exceed 26% by weight based on the total weight of the composition of the invention. The amount of organic solvents, based on the total weight of the composition of the invention, is preferably not more than 23% by weight, more preferably in the range from 22% to 10% by weight and very preferably 21% to 12% by weight.

The total solids content of all the nonvolatile constituents is at least 12.5%, more preferably 12.6% to 17.0% and very preferably 13.0% to 16.6%, by weight, based in each case on the total weight of the composition of the invention. The total solids content can be determined by drying the composition at 120° C. for one hour.

The compositions of the invention may further comprise at least one other component (D). Where externally crosslinking polyurethanes (A) are used (D) comprises a crosslinking agent. However, (D) also includes other, polyurethane-free binders that may be present in addition to the polyurethane binder (A), such as polyester resins or poly(meth)acrylic add resins or poly(meth)acrylate resins, for example.

Examples of suitable crosslinking agents (D) are known from German patent application DE 199 48 004 A1, page 14 line 32 to page 16 line 14. They are preferably used in the amounts specified there. Other crosslinking agents which can be used include unblocked or blocked polyisocyanates, amino resins, such as, more particularly, melamine-formaldehyde crosslinkers, or TACT.

The compositions of the invention may further, and not least, comprise at least one typical coatings additive in effective amounts, as adjuvant (E). Examples of suitable coatings additives (E) are known from German patent application DE 199 48 004 A1, page 16 line 15 to page 17 line 5. Examples of other adjuvants (E) also comprise dyes or color pigments of organic or inorganic type. Adjuvants (E) are understood herein to be only those which are different from the components subsumed under the constituents (A), (B), (C) and (D).

Component (E) may therefore also include effect pigments other than component (B). Since, however, the presence of further effect pigments is not necessary for attaining the purpose of a very high metallic flop, and may even prevent it, preference is given to those compositions of the invention which other than (B) contain no further effect pigments. If all that is desired is a further increase in the flop, without regard for the other performance parameters, then the admixing of small fractions of PVD metallic effect pigments may contribute to a further increase in flop.

The compositions of the invention are produced preferably by means of the process of the Invention. In that process, the above-described constituents (A), (B) and (C) and also optionally, (D) and/or (E), are dispersed in an aqueous medium, more particularly water, and then the resulting mixture is homogenized. Viewed in terms of method, the process of the invention has no peculiarities but can instead be carried out using the customary and known mixing techniques and mixing assemblies, such as stirred tanks, dissolvers, agitator mills, kneading devices, static mixers or extruders.

On account of the many special advantages of the compositions of the invention and of the compositions produced using the process of the invention, more particularly the compositions of the invention produced by the process of the invention, they can be put to numerous end uses.

Preferably, they are used as coating materials for producing single-coat and preferably multicoat effect coatings. With particular preference, they are used as aqueous basecoat materials for producing effect basecoats, and also color and effect basecoats, as part of multicoat paint systems, preferably multicoat paint systems for motor vehicles, more particularly high-value automobiles.

With very particular preference, the multicoat paint systems are produced by the following process, by
(1) applying at least one aqueous basecoat material of the invention to a primed or unprimed substrate, to give at least one aqueous basecoat film (1),
(2) applying at least one clearcoat material to the aqueous basecoat film (1), to give at least one clearcoat film (2), and
(3) jointly curing at least the aqueous basecoat film(s) (1) and the clearcoat film(s) (2) to give the basecoat (1) and the clearcoat (2).

In the process of the invention for producing a multicoat paint system, the individual coats of paint are applied preferably by what is called the wet-on-wet method. Examples of such wet-on-wet methods are known from German patent application DE 199 48 004 A1, page 17 line 37 to page 19 line 22.

In one particularly preferred embodiment, the multicoat paint systems are obtainable by the primed substrate used in step (1) above being a substrate primed with a primer, the primer having been applied in an electrostatic coating process (ESTA coating). It is preferred to apply two primer coats in succession by ESTA. The primer coat or primer coats preferably each possess a dry film thickness of 10 to 25 µm. Where the preferably two primer coats are applied, each of them, preferably, possesses a dry film thickness of 10 to 26 µm, more preferably a dry film thickness of 15 to 20 µm.

Subsequently, in this preferred embodiment of the multicoat paint system, the coating material composition of the invention is applied once, preferably twice, in a dry film thickness of in each case 4 to 9 µm, more preferably 5 to 8 µm. In this case, application by ESTA or pneumatically is possible. In the case of a two-fold application, this application may be made two times pneumatically, two times by ESTA, or once by ESTA and once pneumatically. In the latter case, normally, an ESTA application is carried out first, and the subsequent, second application is carried out pneumatically. It is particularly advantageous and surprising that the coating materials of the invention can also be applied by ESTA and in that case produce the desired properties.

The clearcoat material applied in step (2) of the preferred embodiment is preferably applied as a single coat, more preferably by means of ESTA, in a dry film thickness of preferably 25 to 60 µm, more preferably 30 to 45 µm and very preferably 35 to 40 µm.

A preferred multicoat paint system of the invention produced in this way, accordingly, possesses one or two, preferably two, primer coats having a dry film thickness of in each case 10 to 25 µm, more preferably in each case 15 to 20 µm, and also one or two, preferably two, paint coats of the coating material composition of the invention, applied to the single or last primer coat, with an overall dry film thickness in each case of 8 to 18 µm, more preferably in each case 10 to 16 µm and, finally, a clearcoat topcoat in a thy film thickness of preferably 25 to 60 µm, more preferably 30 to 45 µm and very preferably 35 to 40 µm. The clearcoat material used is a 2-component clearcoat (2K clearcoat) or a 1-component clearcoat (1K clearcoat), more preferably a 1K clearcoat. In comparison to conventional paint systems, this particularly preferred multicoat paint system possesses a significantly lower film thickness for properties which continue to be outstanding. It is also obtainable in fewer worksteps, and is more favorable in terms of the amount of paint consumed.

The resultant effect coatings and color and effect coatings of the invention, more particularly the multicoat paint systems of the invention, preferably have a flop index $FL_{X\text{-}Rite}$ of 15 or more, calculated in each case by the X-Rite company formula:

$$FL_{X\text{-}Rite}=2.69(L^{*}_{15°}-L^{*}_{110°})^{1.11}/(L^{*}_{45°})^{0.86}$$

Surprisingly, the respective color and effect coatings of the invention, more particularly the multicoat paint systems of the invention, in comparison to solvent-based paint systems, no longer exhibit any instances of light/dark shading (clouds).

All in all, the effect coatings of the invention, more particularly the multicoat paint systems of the invention, exhibit an outstanding profile of performance properties, which is outstandingly well balanced in terms of mechanical properties, optical properties, corrosion resistance, intercoat adhesion, clearcoat adhesion, and substrate adhesion, Particularly noteworthy are the outstanding overall visual appearance and the particularly strongly pronounced, viewing-angle-dependent light/dark behavior (metallic flop), which is attributable to the basecoat of the invention being free from film defects. Moreover, the color and effect coatings of the invention, more particularly the multicoat paint systems of the invention, exhibit particularly esthetically appealing, elegant, full color effects with minimal sparkle effect (glitter effect).

Optimum results are obtained when there is compliance, for the composition of the invention, with the preferred and/or particularly preferred ranges identified earlier on above in respect of the total binder content, amount of polyurethane binder (A), total solids content, amount of laminar metallic pigments (B), solvent content, and, in particular, the weight ratio of (B) to the total binder content, and also the ratio of the inorganic thickener (C1) to the organic thickener (C2) and the total amount of thickener (C) relative to the total binder content.

A typical particularly preferred composition of the invention therefore contains, for example:
  laminar metallic effect pigments (B) in a fraction of 9.1% to 20% by weight, based on the binder content and/or 0.75% to 4% by weight, based on the total weight of the composition of the invention
  binder in a total amount of 12% to 14.5% by weight, based on the total weight of the composition of the invention, and complies, where appropriate, with one or more of the following criteria, such as
  a polyurethane binder (B) content of at least 30% by weight, based on the total binder content
  a total solids content of 12.6% to 17% by weight
  a weight ratio of organic thickeners (C2) to inorganic thickeners (C1) of >0.5
  a total fraction of thickener (C) based on the total binder content of <12.5% by weight, and
  an organic solvent content of 12% to 21% by weight, based on the total weight of the composition.

Each of the ranges specified in the typical particularly preferred composition can of course be extended or restricted within the limits of the invention. Thus each individual one of the stated ranges may be replaced by a further inventive range as specified in the description, or may be restricted with inclusion of one of the specified upper or lower limits, without alteration to the essence of the invention. Optimum results, however, particularly in terms of the metallic flop of the coatings and also of the adhesion properties and gloss retention, particularly after various exposure tests (CCC test and WOM test), are anticipated when the particularly preferred ranges are observed.

Preparation of the Coating Systems I (Inventive) and C (Comparative)

Aqueous basecoat I (Inventive):

A stirring vessel was charged with 25 parts by weight of a thickener (paste of a sodium magnesium phyllosilicate, Laponite® RD, 3 percent in water). Added thereto were 19.80 parts by weight of the polyurethane dispersion from German patent application DE 40 09 858 A1, column 16 lines 10 to 35, "C. Preparation of an aqueous polyurethane resin dispersion", with stirring. Added to the resultant mixture with stirring were 0.94 part by weight of the commercial wetting agent Surfynol® 100 (50 percent in butylglycol) and 4.2 parts by weight of deionized water. Subsequently a mixture of 3.33 parts by weight of a commercial water-dilutable melamine-formaldehyde resin (Cymel® 327) and 1.00 part by weight of an aqueous polyester resin dispersion from German patent application DE 40 09 858 A1, column 16 lines 37 to 59, "D. Preparation of an aqueous polyester resin dispersion", 2.1 parts by weight of butylglycol, 0.94 part by weight of the commercial wetting agent Surfynol® 100 (50 percent in butylglycol) and 0.2 part by weight of dimethylethanolamine (10 percent in deionized water) were added, with stirring. The resulting mixture was admixed with 3.12 parts by weight of the polyurethane-modified polyacrylate resin from German patent application DE 44 37 535 A1, page 7 line 55 to page 8 line 23, "D. Preparation of the inventive polyurethane-modified polyacrylate". Added to the resulting mixture with stirring were 0.94 part by weight of the so commercial wetting agent Surfynol® 100 (50 percent in butylglycol), 1.24 parts by weight of a 50 percent strength solution of the commercial associative polyurethane thickener Nopco® DSX 1550 in butylglycol and 0.52 part by weight of the commercial, non-associative thickener Viscalex® HV30 (methacrylate copolymer based on ($C_1$-$C_6$)-alkyl (meth)acrylate and (meth)acrylic acid), and also, in portions, 18.72 parts by weight of water. The resulting mixture was admixed with an aluminum effect pigment effect paste composed of 0.75 part by weight of Hydrolan 3560, 2.22 parts by weight of Hydrolux 3690 from Eckart, 2.98 parts by weight of propoxypropanol, 2.98 parts by weight of butylglycol and 5.9 parts by weight of mixing varnish from WO 2006/040284 A1 (page 14 lines 17-27), with stirring, and then, in addition, 3.12 parts by weight of Isopronal were added.

The resulting mixture was homogenized.

For application, the aqueous basecoat I was adjusted using a ten percent strength aqueous dimethylethanolamine solution and deionized water, to a pH of 7.8 to 8.2 and an application viscosity of 65-75 mPas at 23° C. and a shear rate of 1000 $s^{-1}$.

The nonvolatiles fraction (1 h 120° C.) of I is 14.6%.

Aqueous Basecoat C (Comparative, as Per WO 2008/141768A1):

A stirring vessel was charged with 26 parts by weight of a thickener (paste of a sodium magnesium phyllosilicate, Laponite® RD, 3 percent in water). Added thereto were 10 parts by weight of the polyurethane dispersion from German patent application DE 40 09 858 A1, column 16 lines 10 to 35, "C. Preparation of an aqueous polyurethane resin dispersion", with stirring. Added to the resultant mixture with stirring was 1.0 part by weight of the commercial wetting agent Surfynol® 100 (50 percent in butylglycol). Subsequently a mixture of 1.7 parts by weight of a commercial water-dilutable melamine-formaldehyde resin (Cymel® 327) and 2.0 parts by weight of an aqueous polyester resin dispersion from German patent application DE 40 09 858 A1, column 16 lines 37 to 59, "D. Preparation of an aqueous polyester resin dispersion", 1.0 part by weight of butylglycol, 1.0 part by weight of the commercial wetting agent Surfynol® 100 (50 percent in butylgiycol) and 0.1 part by weight of dimethylethanolamine (10 percent in deionized water) were added, with stirring. The resulting mixture was admixed with 1.6 parts by weight of the polyurethane-modified polyacrylate resin from German patent application DE 44 37 535 A1, page 7 line 55 to page 8 line 23, "D. Preparation of the inventive polyurethane-modified polyacrylate". Added to the resulting mixture with stirring were 1.5 parts by weight of the commercial wetting agent Surfynol® 100 (50 percent in butylglycol), 0.2 part by weight of the commercial free-radical scavenger Tinuvin 123, 0.7 part by weight of a 50 percent strength solution of the commercial associative polyurethane thickener Nopco® DSX 1550 in butylglycol and 0.3 part by weight of the commercial, non-associative thickener Viscalex® HV30 (methacrylate copolymer based on ($C_1$-$C_6$)-alkyl (meth)acrylate and (meth)acrylic acid), and also, in portions, 43.3 parts by weight of water. The resulting mixture was admixed with a paste composed of 3.7 parts by weight of a laminar aluminum effect pigment (8) produced by a PVD process (Alu-Hydroshine® WS3001 from Eckert) and 3.7 parts by weight of a mixture from German patent application DE 102 40 972 A1, page 7 paragraph [0053] composed of Viscalex® HV30, an organic amine, Surfynol® 100, the nonionic surfactant Hydropalat® 3037 from Cognis and water.

The resulting mixture was homogenized, giving the aqueous basecoat C.

For application, the aqueous basecoat C was adjusted using a ten percent strength aqueous dimethylethanolamine solution and deionized water, to a pH of 7.8 to 8.2 and an application viscosity of 30-40 mPas at 23° C. and a shear rate of 1000 $s^{-1}$.

The overview below compares the compositions I and C with one another in terms of differences material to the invention:

Overview

| Feature | I | C |
| --- | --- | --- |
| Amount of B) based on the binder content of the composition (in % by weight) | 13.6% | 5.01% |
| Total solids of the composition (in % by weight) | 14.6% | 7.9% |
| Amount of the sum of the thickeners C1) and C2) based on the binder content of the composition (in % by weight) | 8.8 | 14.1 |
| Weight ratio of C2) to C1) | 0.547 | 0.338 |

Production of Multicoat Paint Systems

The multicoat paint systems were produced using basecoats I (inventive) and C (comparative).

Inventive Multicoat Paint Systems I-MPS-EP-2K and I-MPS-EP-1K

Metal bodywork panels with dimensions of 30 times 70 cm, which had already been coated with a customary and known, cathodically deposited and baked electrocoat, were coated with a commercial water-based surfacer from BASF Coatings AG, after which the resulting surfacer films were flashed off at 20° C. and a relative humidity of 65% for 5 minutes and baked in a forced-air oven at 160° C. for 20 minutes. After the bodywork panels had cooled to 20° C., the aqueous basecoat was applied in two spray passes, with an application ratio of 60:40. The first application took place by electrostatic high-speed rotation using an ECO Bell 2 from Dürr (distance: 0.25 m; paint outflow rate: 150 ml/min; rotational speed 45 000 rpm; voltage: 65 kV). This was followed by flash-off at 20° C. and a relative humidity of 65% for 30 seconds. The second application took place pneumatically (distance: 0.3 m; paint outflow rate: 200 ml/min; atomizer air volume: 240 l/min (stp); atomizer air pressure: 4.8 bar; horn air volume; 310 l/min (stp); horn air pressure: 5.2 bar). This gave a dry film thickness of 12 µm. The aqueous basecoat films were then predried at room temperature for 10 minutes and at 80° C. for 10 minutes. After the bodywork panels had cooled to 20° C., the aqueous basecoat films were coated with a commercial two-component clearcoat material from BASF Coatings AG (resulting in the inventive multicoat paint system I-MPS-EP-2K) or with a commercial one-component clearcoat material (resulting in the inventive multicoat paint system I-MPS-EP-1K), giving a dry film thickness of 40 µm. Thereafter the surfacer films, aqueous basecoat films, and clearcoat films were baked at 140° C. for 30 minutes (two-component clearcoat material) or at 130° C. for 30 minutes (one-component clearcoat material).

Comparative Multicoat Paint Systems C-MPS-EP-2K, C-MPS-PP-1K, C-MPS-EP-2K and C-MPS-EP-1K Metal bodywork panels with dimensions of 30 times 70 cm, which had already been coated with a customary and known, cathodically deposited and baked electrocoat, were coated with a commercial water-based surfacer from BASF Coatings AG, after which the resulting surfacer films were flashed off at 20'C and a relative humidity of 65% for 5 minutes and baked in a forced-air oven at 160° C. for 20 minutes. After the bodywork panels had cooled to 20° C., the aqueous basecoat C was applied in two spray passes. The first application took place pneumatically (distance: 0.5 m; paint outflow rate: 300 l/min (stp); atomizer air volume: 320 l/min (stp); atomizer air pressure: 4.8 bar; horn air volume: 380 l/min (stp); horn air pressure: 5.2 bar), giving a dry film thickness of 2 to 3 µm. This was followed by flash-off at 20° C. and a relative humidity of 65% for 2 minutes. The second application took place likewise pneumatically under the conditions identified above, giving a dry film thickness of 2 to 3 µm. The aqueous basecoat films were then predried at 80° C. for 10 minutes. After the bodywork panels had cooled to 23° C., the aqueous basecoat films were coated with a commercial two-component clearcoat material from BASF Coatings AG (resulting in the comparative multicoat paint system C-MPS-PP-2K) or with a commercial one-component clearcoat material (resulting in the comparative multicoat paint system C-MPS-PP-1K), giving a dry film thickness of 40 µm. Thereafter the surfacer films, aqueous basecoat films, and clearcoat films were baked at 140° C. for 30 minutes (two-component clearcoat material) and at 130° C. for 30 minutes (one-component clearcoat material).

In a second experiment, the comparative example as well, like the inventive example, was painted using ESTA/pneumatic (resulting in the comparative multicoat paint system C-MPS-EP-2K (with 2K clearcoat) or C-MPS-EP-1K (with 1 clearcoat)). The outflow rates were adapted in accordance with the solids content. The resulting basecoat film thickness was 6 µm.

Comparison of the Inventive Multicoat Paint Systems with the Comparative Multicoat Paint Systems All of the multicoat paint systems were subjected to measurement with the aid of an X-Rite spectrophotometer (MA48 multi-angle spectrophotometer). From the lightness values determined for the multicoat paint systems, for viewing angles of 15°, 45° and 110°, it is possible to calculate the so-called X-Rite flop index in accordance with the following formula $$FL_{X\text{-}Rite}=2.69(L^*_{15°}-L_{110°})^{1.11}/(L^*_{45°})^{0.86}.$$

The comparative example C-MPS-PP-2K, applied exclusively pneumatically in terms of the comparative aqueous basecoat, with the aqueous basecoat based on PVD aluminum pigments gave an $FL_{X\text{-}Rite}=26$.

In the case of the combined application of the aqueous basecoat based on PVD aluminum pigments by ESTA and pneumatically (comparative example: C-MPS-EP-2K), this figure reduced to $FL_{X\text{-}Rite}=20$.

The BYKmac instrument from Byk Gardner was used to measure the graininess. For the visual perception of coarseness, the viewing angle at 15 is particularly important. With metallic paints, the SG-15° value, which is calculated from the sparkle area and the intensity, describes the homogeneity, i.e., the non-sparkle behavior (scattering) of the paint system. All so of the respective measurements were made using the BYKMac instrument from Byk-Gardner in accordance with procedures which can be found in the instrument documentation.

Table 1 gives an overview of the X-Rite flop index values obtained and of the lightness value $L^*_{15}°$ which is essential for the formation of light/dark shading (clouds) and also of the graininess and the SG-15° value.

TABLE 1

| Sample | $L^*_{15°}$ | $FL_{X\text{-}Rite}$ | Graininess | SG-15° value |
|---|---|---|---|---|
| I-MPS-EP-2K | 150.6 | 17.5 | 3.1 | 1.33 |
| C-MPS-EP-2K | 150.6 | 20.0 | 2.85 | 0.88 |
| Ford Moondust Masterpanel | 137.4 | 14.3 | 3.74 | 2.96 |
| BMW Titansilber II Masterpanel | 121.2 | 11.6 | 3.72 | 2.03 |

The effect of the inventive multicoat paint system I-MPS-EP-2K is of a similar quality to that of the comparative multicoat paint system C-MPS-EP-2K, based on PVD metallic effect pigment, this effect not being nearly achieved by state-of-the-art silver multicoat paint systems (Ford, BMW) in terms of the combination of fineness (homogeneity, characterized by the SG-15° value) or visual assessment, lightness ($L^*_{15}°$) and flop index ($FL_{X\text{-}Rite}$).

In addition, the multicoat paint systems I-MPS-EP-2K and C-MPS-EP-2K were subjected, in a first experiment, for 4000 hours to Weather-OMeter® weathering using a Weather-OMeter from Atlas Material Testing Technology LLC (WOM weathering in accordance with SAE J 2527-04), and in a subsequent step, for 72 hours to a constant condensation climate test (CCC test; in accordance with DIN EN ISO 6270-2), Prior to the WOM weathering, directly after the WOM weathering, and directly after the CCC test, the adhesive strength was determined in the cross-cut test in accordance with DIN EN ISO 2409, the gloss was determined at an angle of 20°, and the blistering was determined in accordance with DIN EN ISO 4628-2, The results are summarized in table 2.

TABLE 2

| Sample | Before WOM test Adhesive strength (cross-cut) | After 4000 hours WOM test Adhesive strength (cross-cut) | After 4000 hours WOM test Gloss 20° | After additional 72 hours CCC test Adhesive strength (cross-cut) | After additional 72 hours CCC test Gloss 20° | After additional 72 hours CCC test Blistering |
|---|---|---|---|---|---|---|
| I-MPS-EP-2K | GT0 | GT0 | 98% | GT1 | 91% | M0G0 |
| C-MPS-EP-2K | GT0 | GT2 | 99% | GT5 | 86% | M0G0 |

In tables 3 and 4, the inventive and comparative multicoat paint systems coated with the 1 clearcoat are subjected to the test methods already described above (but for differing periods of time).

TABLE 3

| Sample | Before CCC test Adhesive strength (cross-cut) | After 10 days CCC test Adhesive strength (cross-cut) | After 10 days CCC test Gloss 20° | After 10 days CCC test Blistering | After 10 days CCC test Stone chip resistance |
|---|---|---|---|---|---|
| I-MPS-EP-1K | GT0 | GT0 | 98% | M0G0 | 1.5 |
| C-MPS-EP-1K | GT0 | GT5 | 97% | M3G2 | 3 |

The gloss was measured in accordance with DIN 67530.

The stone chip resistance was determined in accordance with DIN EN ISO 20567-1 (method A). The higher the figure, the poorer the stone chip resistance.

TABLE 4

| Sample | Before 3000 hours WOM test Adhesive strength (cross-cut) | After 3000 hours WOM test Adhesive strength (cross-cut) | After additional 72 hours CCC test Adhesive strength (cross-cut) | After additional 72 hours CCC test Gloss 20° | After additional 72 hours CCC test Blistering |
|---|---|---|---|---|---|
| I-MPS-EP-1K | GT0 | GT0 | GT1 | 90% | M0G0 |
| C-MPS-EP-1K | GT0 | GT5 | GT5 | 69% | M3G2 |

As can be seen from the results contained in tables 3 and 4, the adhesive strength (in the cross-cut test) and the gloss (at 20°) of the coating materials of the invention, in particular when using one-component clear at materials, are significantly higher according to the CCC test and a combination of WOM and CCC tests. In addition, the multicoat paint systems of the invention have no tendency toward blistering.

Testing for Sanding Spots and Masking of Sanding Scars with Sandpaper (800 Grads) in Accordance with Audi Test Specification 4.7.3

TABLE 5

| Sample | Sanding spot in clearcoat | Sanding scars in clearcoat | Sanding spot in surfacer | Sanding scars in surfacer |
|---|---|---|---|---|
| I-MPS-EP-2K | 3 | 3 | 3 | 3 |
| C-MPS-EP-2K | 6 | 6 | 6 | 6 |

Evaluation took place according to the "school grade" principle (1=not visible to 6=markedly visible).

All of the inventive paints investigated gave evidence of good circuit line stability and standing stability. All of the requirements in terms of clouding tendency and popping marks that are imposed on paints in the production-line (OEM) finishing of automobiles are met as well.

What is claimed is:

1. A thermally and/or physically curable aqueous coating material composition comprising:
   A) at least one polyurethane selected from the group consisting of physically curable, thermally self-crosslinking and/or thermally externally crosslinking, ionically and/or nonionically stabilized polyurethanes which are saturated, unsaturated and/or grafted with olefinically unsaturated compounds, as binder
   B) at least one laminar metallic effect pigment not produced via a PVD process, and
   C) at least one inorganic thickener C1) selected from the group of the phyllosilicates, and at least one organic thickener C2) selected from the group of the (meth)acrylic acid-(meth)acrylate copolymer thickeners and polyurethane thickeners,
   where
   i) the amount of B), based on the total binder content of the coating material composition is >9% by weight,
   ii) the total solids based on the coating material composition is between 12.5% by weight and 17% by weight,
   iii) the total amount of the thickeners C1 and C2), based on the total binder content of the coating composition is <12.5% by weight,
   iv) the weight ratio of C2) to C1) is >0.4, and
   v) the amount of B), based on the coating material composition, is between 1.2 and 2.3% by weight;
   wherein the laminar metallic effect pigment (B) is an aluminum effect pigment with silver dollar morphology.

2. The composition of claim 1, wherein the laminar metallic effect pigment (B) possesses a particle size distribution characterized by a $D_{90}/D_{10}$ ratio in the range of 2-3.

3. The composition of claim 1, wherein the laminar metallic effect pigment (B) has an average pigment fineness $D_{50}$ of 5 to 30 μm.

4. The composition of claim 1, wherein thickener C2) comprises at least one member selected from the group consisting of a (meth)acrylic acid-(meth)acrylate copolymer thickener in which (meth)acrylates copolymerized are those formed from (meth)acrylic acid and an alkanol selected from the group consisting of $C_1$-$C_6$ alkanols, $C_7$-$C_{30}$ alkanols, and mixtures thereof; a hydrophobically modified ethylene oxide-urethane (HEUR) comprising ethylene oxide units, propylene oxide units, and mixtures thereof; and mixtures of the two foregoing members.

5. The composition of claim 1, wherein the organic thickener C2) is a mixture of a (meth)acrylate copolymer and polyurethane.

6. A process for preparing a composition of claim 1, comprising dispersing at least one polyurethane (A) and at least one laminar metallic effect pigment (B) and one or more thickener(s) (C) in an aqueous medium and homogenizing the resulting mixture.

7. A method of making a coated substrate, comprising applying the curable aqueous coating material of claim 1 a substrate.

8. The method of claim 7, wherein the coated substrate comprises a coating selected from the group consisting of single-coat effect coatings, multicoat effect coatings, and color and effect coatings.

9. A process for producing a multicoat paint system, comprising (1) applying the composition of claim 1 as at least one aqueous basecoat material to a primed or unprimed substrate, to give at least one aqueous basecoat film (1), (2) applying at least one clearcoat material to the aqueous basecoat film(s) (1), to give at least one clearcoat film (2), and (3) jointly curing at least the aqueous basecoat film(s) (1) and the clearcoat film(s) (2) to give a basecoat (1) and a clearcoat (2).

10. The process of claim 9, wherein the at least one aqueous basecoat film (1) is applied by means of an electrostatic coating process (ESTA).

11. A multicoat paint system obtained by the process of claim 10.

12. The composition of claim 1, wherein the laminar metallic effect pigment (B) comprises a first aluminum effect pigment with silver dollar morphology that is chrome-treated and a second aluminum effect pigment with silver dollar morphology that is silica-encapsulated.

13. The composition of claim 1, wherein the laminar metallic effect pigment (B) excludes cornflake pigment grades.

\* \* \* \* \*